Feb. 29, 1972 R. S. LUTZKER Re. 27,301

CAN CLOSURE PLUG

Original Filed March 8, 1968

INVENTOR.
Robert S. Lutzker

BY Yuter & Spiecens

ATTORNEYS

United States Patent Office

Re. 27,301
Reissued Feb. 29, 1972

27,301
CAN CLOSURE PLUG

Robert S. Lutzker, Scarsdale, N.Y., assignor of thirty-three and one-third percent to Lawrence D. Lutzker, Scarsdale, N.Y.

Original No. 3,445,030, dated May 20, 1969, Ser. No. 711,557, Mar. 8, 1968. Application for reissue Feb. 6, 1970, Ser. No. 9,141
Int. Cl. B65d *43/10*
U.S. Cl. 220—60 11 Claims

Matter enclosed in heavy brackets [ ] appears in the original patent but forms no part of this reissue specification; matter printed in italics indicates the additions made by reissue.

ABSTRACT OF THE DISCLOSURE

A closure for sealing a can opening defined in the top end wall of the can comprising a substantially resilient member which is provided with a peripheral groove of decreasing depth from front to rear. The front portion is slid into place with the edge walls of the opening received in the groove. The decreasing depth of the groove facilitates snapping the remainder of the member into place to seal the opening.

This invention relates generally to a closure member for sealing an opening in a container and, more particularly, pertains to a member for closing the opening in the top end wall of a so-called pop-open can.

Presently, "pop-open" cans of the type having a tab opener in the top end wall of the can are gaining widespread use as containers for beverages, including carbonated drinks. When the tab is removed, an elongated opening is formed in the top wall through which the drink may be dispensed. However, a problem is presented if a portion of the drink is to be preserved for later consumption, particularly if the drink is carbonated.

More specifically, the carbonation in the drink simply will escape through the opening in the can thereby leaving the drink "flat." As a result, the primary drawback to the use of such pop-open cans resides in the fact that the drink must be finished immediately or very soon after opening the can.

Accordingly, it is an object of this invention to provide a closure member for removably sealing the end opening of a so-called pop-open can.

A further object of the present invention is to provide a closure member for a can which is provided with means for easily removing the member.

Another object and feature of the invention resides in the novel details of construction which provides a closure member of the type described which easily may be snapped into place to seal a can opening to prevent the escape of gases therefrom.

Still another object of the invention is to provide a closure member for a can which may be used repeatedly, that is simple and rugged in construction and which is economical to manufacture.

Accordingly, a closure device manufactured in accordance with the present invention for sealing a can opening defined in the top end wall of the can comprises a resilient member having a peripheral groove which decreases in depth in a rearward direction. The groove is adapted to receive the edge walls of the opening therein. Additionally, means is provided on said member which is adapted to be grasped by an operator to facilitate removal of the member when it is received in said opening.

Other features and advantages of the present invention will become more apparent from a consideration of the following detailed description when taken in conjunction with the accompanying drawing, in which.

Figure 3:
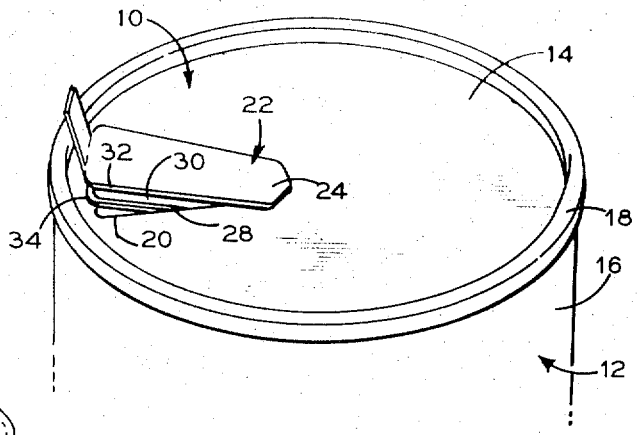
FIG. 3 is a perspective view of the cam closure device shown partially inserted into the opening in the top end wall of a can.

A can closure device constructed in accordance with the present invention is designated generally by the reference numeral 10 in the figures and is adapted to seal an opening in the top end wall of a "pop-open" can. More specifically, as shown in FIG. 3, the can 12 includes a top end wall 14 which is connected to the circular side wall 16 by a bead 18 in the conventional manner. Formed in the top wall 14 of the can 12 is a removable section (not shown) having a key ring attached thereto (similarly not shown) to facilitate removal of the section. When the section is removed an opening 20 is defined in the top wall [15] *14* through which the beverage or contents of the can may be dispensed.

Figure 4:
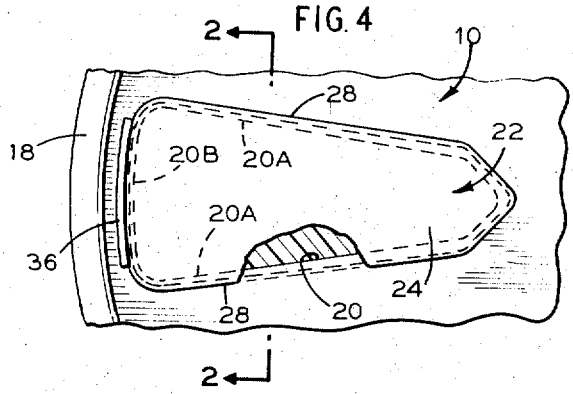
FIG. 4 is an enlarged detailed view, partially in section, illustrating the closure device in sealing position in a can opening.

The opening 20, as shown in FIG. 4, includes side or edge walls 20A which taper outwardly and rearwardly to the bead 18 and terminate at a rear edge wall 20B which is spaced inwardly from the bead 18. It is emphasized that this particular shape of the opening 20 is for illustrative purposes only and is not to be interpreted as being a limitation of the present invention. That is, the opening 20 in the top end wall of the can may conform to any desired tapering shape, it being understood that the closure device 10 will accordingly be dimensioned to seal the particular shape of opening 20 in the end wall 14.

Figure 1:
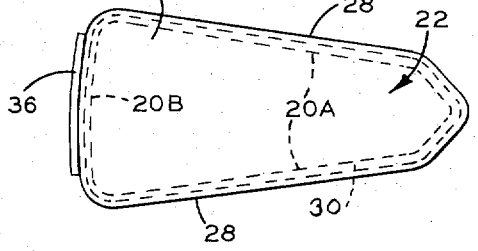
FIG. 1 is a top elevational view of the closure device constructed according to the present invention.

The device 10 includes a body member 22 having a top surface 24, a bottom surface 26, and a peripheral wall 28. The shape of the device 10 conforms to the shape of the opening 20. More specifically, the peripheral wall 28 tapers outwardly from front to rear of the body member 22 and terminates in a rear wall portion. Defined in the peripheral wall 28 is a circumferential groove 30, which extends about the main body member 22. As shown in FIG. 1, the groove 30 decreases in depth from the front to the rear of the device 10 so that the depth of the groove is substantially smaller at the rear (i.e., the left-hand side) of the device 10 than at the front of the device.

Figure 2:
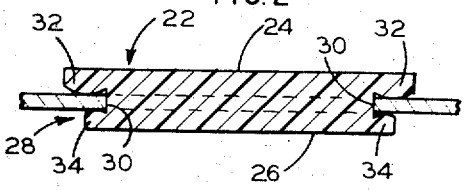
FIG. 2 is a sectional view thereof taken along the line 2—2 of FIG. 4.

To be more specific, the upper wall of the groove 30 is defined by a top flange 32 and the bottom wall of the groove 30 is defined by a bottom flange 34 (FIG. 2). The side walls of the flange portions 34 taper inwardly from the front to the rear of the device 10 so that the extent of the flange 34 adjacent the rear end of the device 10 is substantially smaller than the extent of the flange portion 34 adjacent the front end of the member or device 10. Hence, as noted hereinabove, the depth of the grove 30 decreases in a rearward direction.

Additionally, the upper surfaces of the flange portion 34 are convex upwardly whereas the lower surfaces of the flange portion 32 are convex downwardly so that the walls defining the groove 30 are curved toward each other and, in practice, define a space which is smaller than the thickness of the wall 14.

Figure 5:
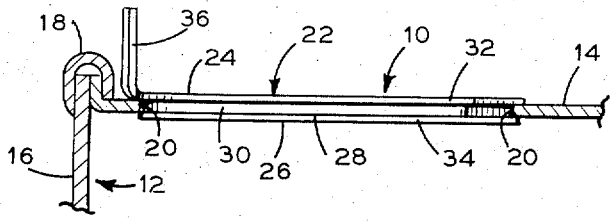
FIG. 5 is a front elevational view, partially in section, of the closure device in sealing position in a can opening.

As shown in FIG. 5, the bottom flange portion 34 and the top flange portion 32 extend rearwardly so that the groove 30 extends across the rear of the body member 22. Moreover, a tab 36 upstands from the rear of the member 22 for reasons which will become apparent from a consideration of the operation of the present invention, as noted in detail below.

The top flange 32 is sized to be slightly greater than the opening 20. In practice, the top flange 32 is designed so that it will extend beyond the edges of the opening 20 by approximately 1/32 of an inch.

In operation, the front of the device 10 is inserted into the opening 20 approximately half way between the front and the rear of the opening with the edge walls 20A received in the groove 30 in the device 10. The device 10 is then slid forwardly by grasping the tab 36 and pushing toward the center of the can. Accordingly, the edge walls 20A defining the opening 20 in the can seat themselves in the groove 30. The device 10 is moved forwardly until the forward edge of the opening 20 abuts the bottom wall of the groove 30. Thereafter, the device 10 is snapped into place by pushing downwardly on the device.

Since the bottom flange 34 is of smaller dimension toward the rear of the body member 22 of the device 10, the downward pressure applied to the rear of the device 10 will cause the rear portion of the bottom flange [32] *34* to buckle slightly thereby permitting the rear portion of the bottom flange 34 to pass through the opening 20 until the top surface of the end wall 14 abut the bottom surface of the top flange 32. Hence, the edge walls defining the opening 20 in the end wall 14 of the can will be securely received in the groove 30 with the upper and lower surfaces of the wall 14 pinched between the top and bottom flanges 32 and 34 of the device 10. That is, the space between the convex surfaces of the flanges is designed to be slightly smaller than the thickness of the wall 14. Accordingly, the flanges will exert a pressure on the surfaces of the wall 14 thereby to seal the opening 20.

In practice, the device 10 may be fabricated from a flexible and resilient material which, ideally, is chemically inert, such as nylon or Teflon or a similar plastic. When it is desired to remove the closure device 10, the tab 36 is grasped and an upward force is exerted on the end of the member 22 via the tab. Accordingly, this upward force will cause the rear portion of the member 22 to move upwardly because of the fact that the depth of the groove 30 is extremely small toward the rear of the device. Thereafter, the device may be moved rearwardly to disengage the front portion of the member 22 from the edge walls of the opening 20.

Accordingly, a closure device for a "pop-open" can has been disclosed for sealing the can to preserve the contents of the can which is simple to manufacture and easy to operate.

While a preferred embodiment of the invention has been shown and described herein, it is obvious that numerous omissions, changes and additions may be made in such embodiment without departing from the spirit and scope of the present invention.

What is claimed is:

1. A closure for sealing an opening defined by the edges of the top end wall of a can comprising a resilient member having a top and a bottom peripheral flange which define a groove therebetween adapted to receive the can edges therein, said bottom peripheral flange tapering inwardly rearwardly whereby the depth of said groove decreases rearwardly to facilitate the reception of the edges into said groove, said member further including tab means adapted to be grasped by an operator for removing said member from said opening.

2. A closure as in claim 1, in which the space between the walls of said groove is smaller than the thickness of the associated end wall of the can.

3. A closure as in claim 2, wherein the walls defining said groove are convex inwardly toward each other.

4. A closure as in claim 1, in which said tab means comprises a tab upstanding from the rear portion of said member.

5. A closure as in claim 1, in which said member is fabricated from a nylon material and said tab means is integral with said member.

6. A can closure for sealing a can opening defined in the top end wall of the can, said closure comprising a resilient member having a peripheral groove which decreases in depth in a rearward direction, said groove being adapted to receive the edge walls of the opening therein, and means on said member adapted to be grasped by an operator to facilitate the removal of said member from the opening.

7. A closure as in claim 6, in which said groove is defined in part by an upper wall which is larger than the opening so that the lower surface of the upper wall abuts the surface of the end wall adjacent to the opening.

8. A closure as in claim 7, in which said groove is further defined by a lower wall in opposed relationship to said upper wall, the opposing surfaces of said upper and lower wall being convex toward each other to firmly grip the top wall of the can to seal the opening.

9. A closure as in claim 6, in which said groove includes a rear portion adapted to receive the edge wall defining the rear of the opening therein.

10. A closure as in claim 6, in which said means includes a tab upstanding from the rear of said member.

*11. An essentially one-piece, molded flexible and resilient can top opening closure for a pop-top can opening of the type which is wider at the can top periphery, which gradually decreases in width and which is narrow at the center of the can top comprising:*

*a top wall constructed and arranged to extend over the opening, the top wall presenting finger-engaging surfaces for facilitating the removal of the sealing lip from within the can and the entire closure from the can top opening, the top wall being larger than the opening so that the lower surface of the top wall abuts the outer surface of the can top adjacent to the opening;*

*an integral body portion depending downwardly from the top wall and having the same general peripheral configuration as that of the edges of the can top defining the top opening whereby the body portion is wider at one end, decreases gradually in width and is narrower at the other end;*

*a sealing lip spaced downwardly from the top wall and extending outwardly from the body portion, the lip being adapted to be inserted through the top opening along with the body portion, the lip having upper surfaces adapted to engage with the inner surfaces of the can top adjacent the top opening and adapted to form a seal therewith to retain the can contents in the can interior and prevent fluid leakage through the top opening passed the closure;*

*the integral body portion, top wall and sealing lip defining a peripheral groove in which the edges of the can top adjacent the top opening are adapted to be received;*

*the effective clearance between opposed surfaces of the top wall and sealing lip being less than the thickness of the can top whereupon the exterior and interior surfaces, respectively, of the can top adjacent the can top opening are engaged when the closure is mounted across the can top opening to seal the*

*contents of the can, the opposed surfaces of said top wall and sealing lip being substantially convex toward each other to firmly grip the top wall of the can in sealing the opening; and*

*the closure being mounted in sealing relationship on the pop-top can across the can top opening and the interior of the can containing a carbonated beverage with the gaseous pressure generated by the beverage in the can interior increasing the seal between the sealing lip and inner surfaces of the can top adjacent the can top opening, the closure and the lower sealing lip being constructed and arranged to prevent unintentional removal of the closure from the can top opening instant to the build up of gas pressure within the can interior.*

References Cited

The following references, cited by the Examiner, are of record in the patented file of this patent or the original patent.

UNITED STATES PATENTS

| | | | |
|---|---|---|---|
| 3,229,478 | 1/1966 | Alonso | 220—24 UX |
| 3,428,212 | 2/1969 | Rohrlick | 220—60 |
| 2,841,307 | 7/1958 | Yoder | 220—24 |
| 3,142,408 | 7/1964 | Joseph et al. | 220—24 |

GEORGE T. HALL, Primary Examiner

U.S. Cl. X.R.

220—244